US012608580B1

(12) United States Patent　(10) Patent No.: US 12,608,580 B1
Partridge et al.　(45) Date of Patent: Apr. 21, 2026

(54) GROMMET IDENTIFIER TAG

(71) Applicant: Scannable NZ Limited, Wanaka (NZ)

(72) Inventors: Robert Partridge, Wanaka (NZ);
Martin Mudry, Wanaka (NZ)

(73) Assignee: Scannable NZ Limited, Wanaka (NZ)

( * ) Notice: Subject to any disclaimer, the term of this
patent is extended or adjusted under 35
U.S.C. 154(b) by 0 days.

(21) Appl. No.: 19/180,941

(22) Filed: Apr. 16, 2025

(51) Int. Cl.
*G06K 19/077*　(2006.01)
*F16B 45/00*　(2006.01)

(52) U.S. Cl.
CPC ...... *G06K 19/07758* (2013.01); *F16B 45/005*
(2021.05); *F16B 2200/95* (2023.08)

(58) Field of Classification Search
CPC ............ A63B 2102/18; A63B 2209/00; A63B
2210/50; A63B 2225/09; A63B 59/50;
A63B 60/04; A63B 60/16; A63B 60/42;
A63B 60/54; A63B 71/0045; A63B
59/54; A63B 60/52; A63B 2071/0694;
A63B 2220/833; A63B 2225/50; A63B
59/51; A63B 60/08; A63B 2024/0015;
A63B 2024/0056; A63B 2071/0638;
A63B 2071/0647; A63B 2102/182; A63B
2209/023; A63B 2209/10; A63B 2220/00;
A63B 2220/10; A63B 2220/12; A63B
2220/30; A63B 2220/40; A63B 2220/64;
A63B 2220/80; A63B 2220/801; A63B
2220/803; A63B 2220/806; A63B
2225/20; A63B 2225/54; A63B 24/0003;
A63B 24/0006; A63B 59/52; A63B
59/58; A63B 60/02; A63B 60/22; A63B
60/24; A63B 60/48; A63B 60/50; A63B
60/56; A63B 71/0622; G06Q 30/0621;
G06Q 30/0631; G06Q 10/087; G06Q
10/00; G06Q 20/00; G06Q 30/00; G06Q
2240/00; G06Q 2250/00; G06Q 2230/00;
G06Q 2220/00; G06Q 99/00; G06Q
90/00; G06Q 50/00; G06Q 40/00; A43B
13/04; A47C 27/085;
(Continued)

(56)　　　　References Cited

U.S. PATENT DOCUMENTS 6,671,987 B1 * 1/2004 Fenton ...................... G09F 3/20
40/6
2009/0188675 A1 * 7/2009 Bloom .................. E21B 17/006
166/381
(Continued)

FOREIGN PATENT DOCUMENTS

EP　　　4080067 B1　9/2024

*Primary Examiner* — Daniel Previl
(74) *Attorney, Agent, or Firm* — Holzer Patel Drennan

(57)　　　　　　ABSTRACT

Described herein is a grommet comprising a body, an
enclosure configured to be moulded onto a portion of the
body; and an identifier tag enclosed within the body and
enclosure. Also described is a carabiner comprising at least
one grommet thereon along with a method of manufacture of
the grommet and method of assembly of the carabiner and
grommet. The grommet may comprise a body comprising a
partial or complete ring shape with an opening therein and
an interior diameter and an exterior diameter; an enclosure
configured to be moulded onto a portion of the body; and an
identifier tag with a first face, a second face and sides, the
identifier tag enclosed on the grommet by the body on first
face, and the enclosure on the second face and the sides of
the identifier tag.

17 Claims, 7 Drawing Sheets

(58) Field of Classification Search
CPC ......... A47C 27/144; A47C 27/15; A47C 4/54; A47C 7/021; B29C 2793/009; B29C 44/50; B29C 44/583; B29C 48/022; B29C 48/08; B29C 48/11; B29C 48/9135; B29C 48/919; B29K 2105/04; B29L 2031/60; C08K 5/0016; C08K 5/01; C08L 2666/02; C08L 51/006; C08L 53/02; C08L 53/025; Y10S 5/909; Y10S 5/948; Y10S 5/953; Y10T 428/24322; Y10T 428/24331; Y10T 29/53687; A61B 17/00491; A61B 17/0057; A61B 17/12118; A61B 17/12181; A61B 17/3468; A61B 18/18; A61B 2017/00411; A61B 2017/0065; A61B 2017/00876; A61B 2017/1205; A61B 17/12013; A61B 17/12022; A61B 18/04; A61B 2017/00407; A61B 2017/00544; A61B 2017/00557; A61B 2017/00862; A61B 2017/12004; A61B 2017/22001; A61B 17/00; A61B 18/02; A61B 18/1492; A61B 18/245; A61B 2017/00809; A61B 2018/00005; A61B 2018/00023; A61B 2018/00345; A61B 2018/00517; A61B 2018/00541; A61B 2018/00577; A61B 2018/00595; A61B 2018/00982; A61B 2018/1861; A61B 2218/002; G01K 1/024; G01K 1/143; G01R 15/142; G01R 15/26; G01R 23/16; G01R 1/22; G01R 15/06; H02J 13/00002; H02J 13/00022; H02J 13/00034; H02J 13/00024; H02J 13/00026; H02J 13/0004; Y02E 60/00; Y04S 10/30; Y04S 40/126; Y04S 10/00; H01J 13/00; A61F 2/82; A61F 2/013; A61F 2/95; A61F 2002/9528; A61F 2210/009; A61K 2300/00; A61K 31/167; A61K 31/4545; A61K 31/727; A61K 45/06; A61M 2025/091; A61M 2025/105; A61M 25/09; A61M 25/10; A61M 37/00; A61N 2005/1011; A61N 7/00; A61N 1/00; A61N 2/00; A61N 5/00; B60R 25/102; B60R 25/33; G01S 13/75; G01S 1/00; G01S 3/00; G01S 5/00; G01S 7/00; G01S 11/00; G01S 13/00; G01S 15/00; G01S 17/00; G01S 19/00; G01S 2201/00; G01S 2205/00; G06F 16/483; G06F 16/58; G06F 1/305; G06F 16/955; G06V 40/16; G06V 40/166; G06V 40/172; G10L 17/00; B41J 3/4075; B41J 3/44; E05B 17/226; E05B 2047/0067; E05B 2047/0071; E05B 2047/0094; E05B 37/0096; E05B 39/04; E05B 41/00; E05B 43/005; E05B 51/00; E05B 63/0004; E05B 63/0052; E05B 63/0069; E05B 63/123; E05B 63/143; E05B 65/006; E05B 65/0089; E05B 65/48; E05B 67/32; E05B 67/38; E05B 67/383; G01N 2035/00801; G01N 2035/00831; G01N 2035/041; G01N 2035/0462; G01N 2035/0465; G01N 2035/0496; G01N 35/00732; G01N 35/026; G01N 35/04; G01N 35/00029; G06T 7/00; G06T 2207/10012; G06T 7/593; G07B 15/04; G07C 2009/00769; G07C 9/00309; G07C 9/0069; G07C 9/00896; G07C 9/10; G07C 9/25; G07C 9/257; G09F 3/02; G09F 3/0294; G09F 3/10; H01H 9/281; H01H 9/283; A61C 1/0084; A61C 17/0202; A61C 17/0208; A61C 5/40; B01L 2200/025; B01L 2200/027; B01L 2200/0689; B01L 2300/042; B01L 2300/0816; B01L 2300/0867; B01L 2400/0481; B01L 2400/065; B01L 3/5023; B01L 3/502707; B01L 3/502715; B01L 3/52; B01L 3/545; B01L 7/52; C12Q 1/6851; C12Q 2561/113; C12Q 2565/629; G02B 6/3825; G02B 6/3879; G02B 6/3895; G02B 6/3897; G06K 19/07773; G06K 7/10356; H01Q 1/2216; H01Q 21/0025; H01Q 7/00; H04L 41/0803; H04N 13/10; H04N 13/293; H04N 13/361; H04N 5/278; H05K 7/1492; H05K 7/1497; H05K 7/20145; H05K 7/20736; H05K 7/20745
USPC ....... 340/572.8, 10.1, 538.15, 538.16, 568.2, 340/572.1–572.7, 572.9, 686.3, 686.5, 340/10.51, 10.52, 825.69
See application file for complete search history.

(56) References Cited

U.S. PATENT DOCUMENTS

| | | | |
|---|---|---|---|
| 2010/0308969 A1* | 12/2010 | Okada | G01D 21/00 |
| | | | 340/10.1 |
| 2014/0343898 A1* | 11/2014 | Thurman | A63B 60/54 |
| | | | 702/189 |
| 2015/0008261 A1* | 1/2015 | Nitta | G06K 19/07771 |
| | | | 29/601 |
| 2016/0175091 A1* | 6/2016 | Van Heugten | A61F 2/14 |
| | | | 623/6.22 |
| 2020/0108579 A1* | 4/2020 | Hosomi | H01Q 1/2241 |
| 2021/0339399 A1* | 11/2021 | Schluntz | G05D 1/0088 |

* cited by examiner

SECTION A-A

GROMMET IDENTIFIER TAG

TECHNICAL FIELD

Described herein is a grommet comprising an identifier tag, a carabiner with a grommet and methods of manufacture and assembly. More specifically, a grommet is described comprising a unique identifier tag configured to be located on a carabiner and which may be used to identify the carabiner or other item to which the grommet is fitted to.

BACKGROUND ART

Identifier tags such as RFID tags and NFC tags are widely used in a variety of ways to provide information about a particular item or items.

Carabiners used in fall safety and climbing are an item that ideally is tracked in terms of use during the life of the carabiner to allow a user to record inspections, determine duration and longevity, and hence provide greater safety.

Carabiners present a challenge in terms of identifier tag placement since they are subject to frequent knocks and bumps during use and transport. They also must not have any snag points or obstructions to rope movement through or about the carabiner parts.

Fixing an identifier tag directly to a carabiner is possible however, the identifier tag may impede rope movement owing to the identifier tag not being smooth in shape. The identifier tag in a direct placement approach like this is also exposed and knocks and bumps may damage the function of the identifier tag. Water or dust exposure of the identifier tag may also be problematic in a direct placement approach. A yet further problem of direct placement may be that of interference of the signal broadcast or received from to by the identifier tag. Because the carabiner is manufactured from a metal or alloy material, the signal may incur interference.

It may be useful to provide an alternative way to couple an identifier tag and carabiner together that address at least one of the above problems with direct placement, or which at least provides the public with a choice.

Further aspects and advantages of the grommet, a carabiner with a grommet, and methods of manufacture and assembly will become apparent from the ensuing description that is given by way of example only.

SUMMARY

Described herein is a grommet comprising a body, an enclosure configured to be moulded onto a portion of the body; and an identifier tag enclosed within the body and enclosure. Also described is a carabiner comprising at least one grommet thereon along with a method of manufacture of the grommet and method of assembly of the carabiner and grommet.

In a first aspect there is provided a grommet comprising an enclosed identifier tag, the grommet comprising:

a body comprising a partial or complete ring shape with an opening therein and an interior diameter and an exterior diameter;

an enclosure configured to be moulded onto a portion of the body; and an identifier tag with a first face, a second face and sides, the identifier tag enclosed on the grommet by the body on first face, and the enclosure on the second face and the sides of the identifier tag.

In a second aspect, there is provided a carabiner comprising a frame and a gate, the carabiner comprising thereon, at least one grommet substantially as described above.

In a third aspect, there is provided a method of manufacture of a grommet substantially as described above by:

selecting a first material to be used to form a body of a grommet;

selecting a second material to be used to form an enclosure of a grommet;

selecting an identifier tag;

over-moulding the enclosure and body around the identifier tag.

In a fourth aspect, there is provided a method of fitting a grommet with an identifier tag to a carabineer by:

selecting a grommet substantially as described above;

selecting a carabiner; and fitting the grommet onto the carabiner.

Advantages of the above grommet comprise one or more of:

Long lifetime and robustness (10+ years);

Enclosure of the identifier tag to encapsulate the tag offering protection from ingress of water or other materials in the wider environment about the carabiner.

Tuning of the NFC Tag (if an NFC tag is used) to a frequency which results in any interference caused by the metal or alloy of the carabiner distorting the identifier tag frequency to the desired frequency (e.g. 13.56 MHz);

The ability to retrofit or fit on manufacture, the grommet;

The ability to adapt placement of the grommet to suit a variety of carabiner designs;

The ability to reliably track unique aspect of a specific carabiner;

Simple method of fitting of the grommet to the carabiner;

Simple manufacture of the grommet;

Versatility in orientation of the identifier tag on the grommet;

Relatively low cost especially when compared to the longevity of the grommet and identifier tag relative to prior art processes where an identifier tag is fixed to a part of the carabiner directly and not enclosed or a part of a grommet.

BRIEF DESCRIPTION OF THE DRAWINGS

Further aspects of the grommet, a carabiner with a grommet, and methods of manufacture and assembly will become apparent from the following description that is given by way of example only and with reference to the accompanying drawings in which.

DETAILED DESCRIPTION

Figure 1:
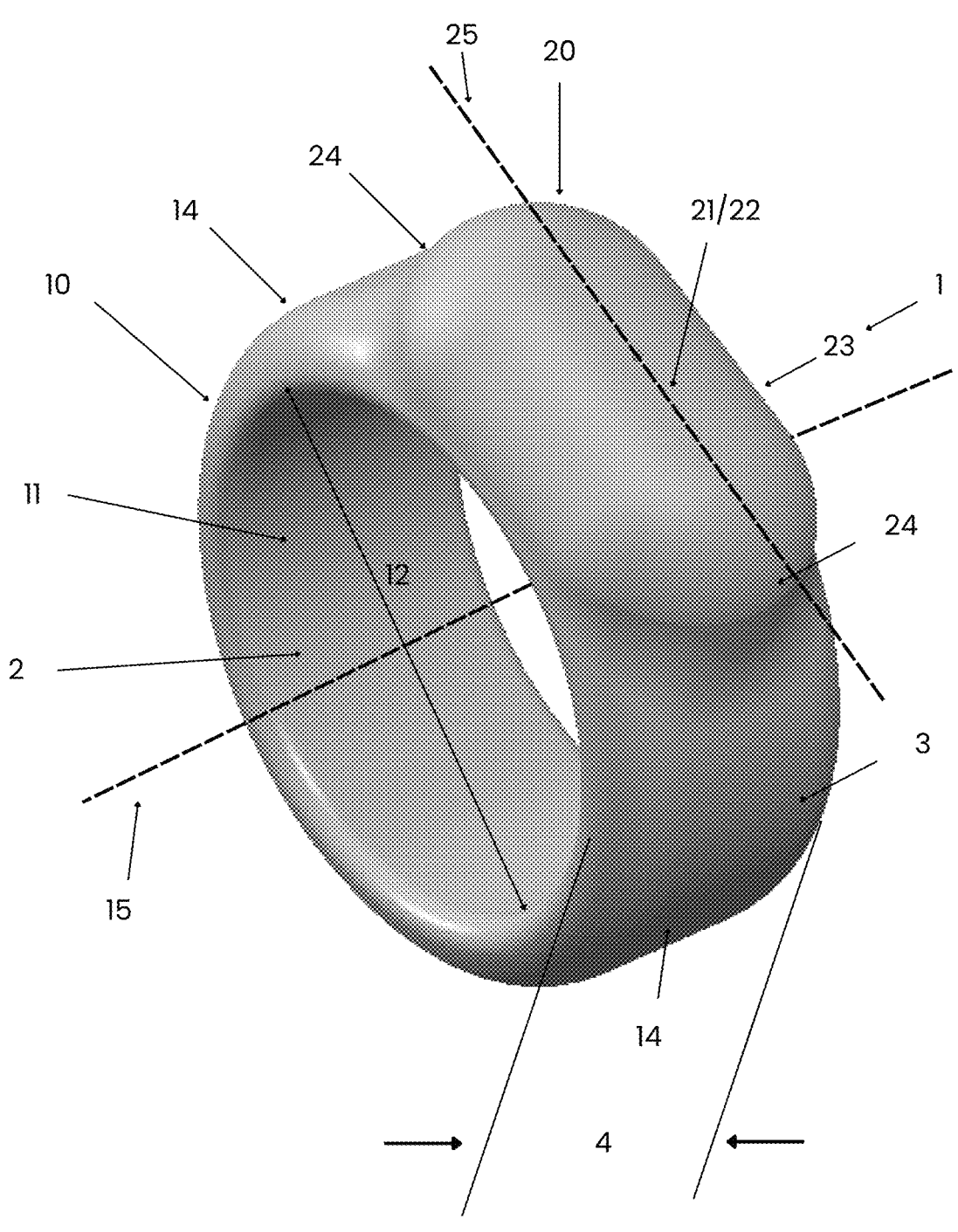
FIG. 1 illustrates a rendered perspective view of a first example of the grommet.

As noted above, described herein is a grommet comprising a body, an enclosure configured to be moulded onto a portion of the body; and an identifier tag enclosed within the body and enclosure. Also described is a carabiner comprising at least one grommet thereon along with a method of manufacture of the grommet ad method of assembly of the carabiner and grommet.

For the purposes of this specification, the term 'about' or 'approximately' or 'substantially' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'comprise' and grammatical variations thereof shall have an inclusive meaning—i.e. that it will be taken to mean an inclusion of not only the listed components it directly references, but also other non-specified components or elements.

The term 'carabiner' refers to a connector, often "O" shaped or "D" shaped, comprising a metal frame with one spring hinged gate opposite a spine of the frame. Carabiners may be used in climbing or fall safety systems as a connector and to hold a freely running rope. The carabiner may also comprise a barrel used to lock the gate to the frame.

Grommet

In a first aspect there is provided a grommet comprising an enclosed identifier tag, the grommet comprising:

a body comprising a partial or complete ring shape with an opening therein and an interior diameter and an exterior diameter;

an enclosure configured to be moulded onto a portion of the body; and an identifier tag with a first face, a second face and sides, the identifier tag enclosed on the grommet by the body on first face, and the enclosure on the second face and the sides of the identifier tag.

Grommet Shape

The interior diameter is smaller than the exterior diameter.

The interior diameter may be configured to provide a snug fit on the gate or frame of a carabiner (or the barrel if a barrel is present). The interior diameter may be configured to provide an interference fit on the gate or frame or barrel of a carabiner.

The internal diameter of the grommet may vary to suit the carabineer shape to which the grommet is fitted.

In one example, the grommet may have a diameter of 8, or 9, or 10, or 11, or 12 mm. This sizing may be matched to the diameter of a gate or frame of a carabiner. Carabiner gates and frames are typically 9-10 mm in diameter with a small degree of variation e.g. +/−0.5 mm. The grommet interior diameter should ideally also be the same diameter or even slightly less to achieve the snug or interference fit noted. Circle tension of the grommet onto the carabiner was found to be an important factor in longevity of the grommet on the carabiner, particularly where a lifetime of 10 or more years is desired.

An exterior surface of the body of the grommet may comprise a generally smooth surface. An exterior surface of the enclosure of the grommet may comprise a generally smooth surface. Both the body and the enclosure of the grommet may comprise a generally smooth surface. The exterior surface may be rounded. The exterior surface may not have any sharp edges or protrusions. This may be important to ensure that the grommet is rope friendly and cannot act as a snag point or wear point of a rope that may rub or otherwise interact with the grommet exterior.

Enclosure

As noted above, the grommet may comprise an enclosure. The enclosure may be raised relative to the exterior diameter of the majority (>50%) of the exterior diameter.

The enclosure may comprise <30, or 20, or 10, or 5% of the overall exterior diameter circumference.

The majority of the grommet may have a thickness that is less than 10% of the interior diameter. The thickness of the grommet about the enclosure may be 1.2 to 3 times the thickness of a portion of the grommet with no enclosure.

The enclosure may be generally rectangular in shape. The enclosure may be aligned so that a longitudinal axis of the enclosure aligns with an internal axis of the opening in the grommet. Alternatively, a longitudinal axis of the enclosure may be orthogonal to an internal axis of the opening in the grommet.

The enclosure may house a unique identifier tag within a highly robust enclosure provided by the polymer from which the enclosure is manufactured. The unique identifier tag may be embedded in the enclosure.

As noted above, an exterior surface of the enclosure of the grommet comprises a generally smooth surface. The surface may be rounded. The surface may not have any sharp edges or protrusions. This may be important to ensure that the grommet is rope friendly and cannot act as a snag point or wear point of a rope that may rub or otherwise interact with the grommet exterior.

Width

The width of a grommet may be approximately equivalent to the width of the enclosure and identifier tag therein. The width of the grommet may for example be <50, or 40, or 30, or 20% of the interior diameter of the grommet.

The width may be commensurate with the width of a ring or groove in the gate or frame or barrel if present of a carabiner such that the grommet at least partly nests into the ring or groove once fitted. In one embodiment, at least the majority of the grommet may be located sufficiently far into the ring or groove so that the exterior diameter is the same or less than an exterior diameter of the carabiner gate or frame i.e. the grommet sits approximately flush with or inside the ring or groove. The enclosure may extend slightly proud of or flush with the exterior diameter of the carabiner exterior gate or frame surrounding the ring or groove.

Materials

The majority of the grommet may be manufactured from a polymer selected to be hard enough for 10 or more years of service but also with some ability to elastically deform at least temporarily about a ring on a carabiner shaft. Having a degree of elasticity may be useful when fitting the grommet to a carabiner to allow the grommet to slip over an somewhat larger shaft or part thereof of a carabiner.

In one example, the hardness of this body of the grommet may be equivalent to a 'hard' hardness using a Shore scale. The hardness may be equivalent to that measured from a shoe heel or pencil eraser to a hardness measured for a shopping cart wheel or vehicle tyre. This may be from a Shore D 30 hardness to a Shore D 60 hardness.

The enclosure may be manufactured from an equivalent hardness or harder polymer to that selected for the body of the grommet. The hardness of the enclosure may also be hard enough for 10+ years of service and hard enough to protect the identified tag located behind the harder polymer of the enclosure. This harder section of the grommet may be useful to provided extra strength and impact resistance to the identifier tag enclosed by the enclosure and harder polymer.

In one example, the hardness of this enclosure of the grommet may be equivalent to a 'hard' to 'extra hard' hardness using a Shore scale. The hardness may be equivalent to that measured from a shoe heel or pencil eraser to a hardness measured from a skateboard wheel or golf ball. This may be from a Shore D 40 hardness to a Shore D 80 hardness.

In one example, the hardness of the enclosure may be the identical to, or greater than, the hardness of the body of the grommet i.e. shore D 40 or harder. In this example, the grommet may lend itself to being retrofitted to the carabiner post manufacture since it is able to be fitted over pins or other structures protruding slightly from the carabiner shaft external diameter.

In an alternative example, the whole grommet including the body of the grommet and the enclosure may have an identical hardness. For example a hardness of Shore D 40, or 45, or 50, or 55, or 60. In this example, the carabiner may be a new carabiner not wholly assembled. The grommet in this example may be slid onto the carabiner and moved along the carabiner gate or frame until a desired position is reached.

The polymer chosen may have thermoplastic properties. The polymer may comprise sufficient thermo-plasticity to soften slightly when placed in hot water (>50 C).

In practice, this means that the polymer may be fitted to a carabiner and onto a gate or frame (or barrel if present) of the carabiner without too much force but sufficient still to impost a fixing force on the carabiner once cooled.

The material chosen may have a coefficient of friction sufficient to adhere or not slip from the carabiner once fitted.

Over-Moulding

The grommet is manufactured by over-moulding. This may be via an injection moulding process where two or more parts are moulded over one another creating a single seamless part (the grommet).

The first part may comprise the over moulding enclosure part of the grommet. The second part may comprise the generally ring shaped structure of the grommet.

Identifier Tag

A variety of identifier tag types may be used. The identifier tag may be an NFC tag. Other identifier tag types may also be used without departing from the invention e.g. an RFID tag. The RFID tag may be a ultra-high frequency (UHF) RFID tag.

The identifier tag may comprise both a chip and an antenna. The identifier tag may also comprise an isolator.

The identifier tag, may be relatively small e.g. 2-6 mm in length and/or width.

The identifier tag when assembled with the body and the enclosure, may sit flat on the body of the grommet body. The identifier tag may sit flat on a portion of the exterior surface of the body of the grommet. The identifier tag may not be bent on or about or between the enclosure and the body of the grommet. This may be important to ensure the strongest possible signal.

The identifier tag may be fully enclosed within the body and the enclosure of the grommet. Fully enclosed refers to the identifier tag and all parts thereof encased by the materials used to form the body and the enclosure. By full enclosure, signal interference by placement against the metal or alloy of the carabiner is avoided and the identifier tag remains separate to the external environment with no water egress into the identifier tag. The identifier tag is also protected from knocks and impacts by the body and enclosures.

The identifier tag identifies to a reader the unique id of the carabiner. The unique id may be linked to history of the carabiner such as date of inspection records, purchase, manufacturer, extent of use and so on. This may be critical to safety and to tracking of equipment use.

Carabiner and Grommet

In a second aspect, there is provided a carabiner comprising a frame and a gate, the carabiner comprising thereon, at least one grommet substantially as described above.

Location on the Carabiner

The at least one grommet may be located on the gate of the carabiner. Placement of the at least one grommet on the gate of a carabiner may be useful in retrofit situations since the gate of a carabiner tends to have a slightly larger diameter than that of the frame of the carabiner. The at least one grommet and the identifier tag therein may be more protected if located on the gate compared to the frame of the carabiner.

The at least one grommet may be located on the frame of the carabiner. Placement of a grommet on the frame of the carabiner may be useful if the grommet is fitted during manufacture of the carabiner i.e. prior to the gate being coupled to the frame of the carabiner. In this example, the grommet may be located on the frame spine.

The carabiner may also comprise a barrel. In this case, the at least one grommet may fit in a position below the barrel and on the gate if the gate is sufficiently long. Alternatively, the at least one grommet may be fitted to the frame of the carabiner. This may be in a position distant to the barrel e.g. the frame spine.

The carabiner may as noted comprise a barrel and the at least one grommet may be located on the barrel.

Method of Manufacture

In a third aspect, there is provided a method of manufacture of a grommet substantially as described above by:

selecting a first material to be used to form a body of a grommet;

selecting a second material to be used to form an enclosure of a grommet;

selecting an identifier tag;

over-moulding the enclosure and body around the identifier tag.

The over-moulding step may be completed using injection moulding. Other methods of moulding may be used comprising gravity pouring, low pressure moulding, over moulding and gas-assisted moulding.

Method of Assembly

In a fourth aspect, there is provided a method of fitting a grommet with an identifier tag to a carabineer by:

selecting a grommet substantially as described above;

selecting a carabiner; and fitting the grommet onto the carabiner.

Heating

The grommet is heated prior to fitting. Heating may relax the material used to form the grommet or at least the grommet body making fitting easier. Heating may be to a temperature of 30-100, or 30-80, or 30-60, or 40-60 C. Heating may occur by placing the grommet in heated water prior to fitting.

Fitting

The grommet may be fitted by forcing a gate or frame of the carabiner through the opening in the grommet. The grommet may slide along the gate frame of the carabiner to some extent during fitting.

Fitting may continue until the grommet is on the gate of the carabiner.

Fitting may continue until the grommet is on the frame of the carabiner.

Fitting of the grommet may continue until the grommet is seated within a groove or recess in the gate or frame of the carabiner.

Assuming the carabiner has a barrel, fitting may continue until the grommet is on the barrel of the carabiner.

Advantages

Advantages of the above grommet comprise one of more of:

Long lifetime and robustness (10+ years);

Enclosure of the identifier tag to encapsulate the tag offering protection from ingress of water or other materials in the wider environment about the carabiner.

Tuning of the NFC Tag (if an NFC tag is used) to a frequency which results in any interference caused by the metal or alloy of the carabiner distorting the identifier tag frequency to the desired frequency (e.g. 13.56 MHz);

The ability to retrofit or fit on manufacture, the grommet;

The ability to adapt placement of the grommet to suit a variety of carabiner designs;

The ability to reliably track unique aspect of a specific carabiner;

Simple method of fitting of the grommet to the carabiner;

Simple manufacture of the grommet;

Versatility in orientation of the identifier tag on the grommet;

Relatively low cost especially when compared to the longevity of the grommet and identifier tag relative to prior art processes where an identifier tag is fixed to a part of the carabiner directly and not enclosed or a part of a grommet.

The embodiments described above may also be said broadly to consist in the parts, elements and features referred to or indicated in the specification of the application, individually or collectively, and any or all combinations of any two or more said parts, elements or features.

Further, where specific integers are mentioned herein which have known equivalents in the art to which the embodiments relate, such known equivalents are deemed to be incorporated herein as if individually set forth.

WORKING EXAMPLES

The above described grommet, a carabiner with a grommet, and methods of manufacture and assembly are now described by reference to specific examples and item numbering below:

1 Grommet
  2 Interior
  3 Exterior
  4 Width
10 Body
  11 Opening
  12 Interior diameter
  13 Exterior diameter
  14 Exterior surface
  15 Opening internal axis
20 Enclosure
  21 Exterior surface
  22 Top
  23 Sides
  24 Ends
  25 Longitudinal axis
30 Identifier tag
  31 First face
  32 Second face
  33 Sides 34 Longitudinal axis
40 Carabiner
  41 Gate
  42 Frame
  43 Groove
  44 Barrel
  45 Frame spine Example 1

Figure 2:
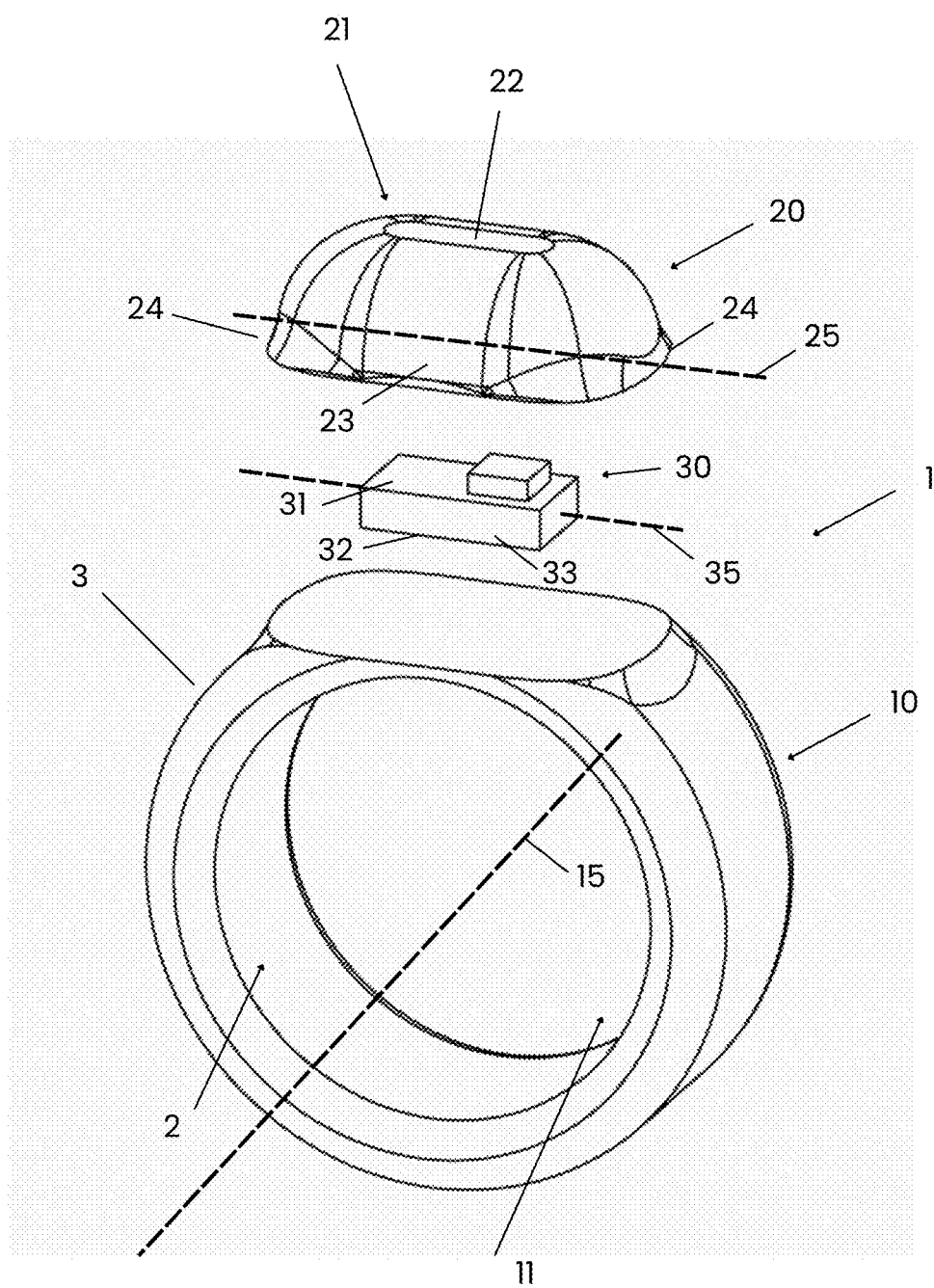
FIG. 2 illustrates an exploded perspective view of the first example of the grommet.
Figure 3:
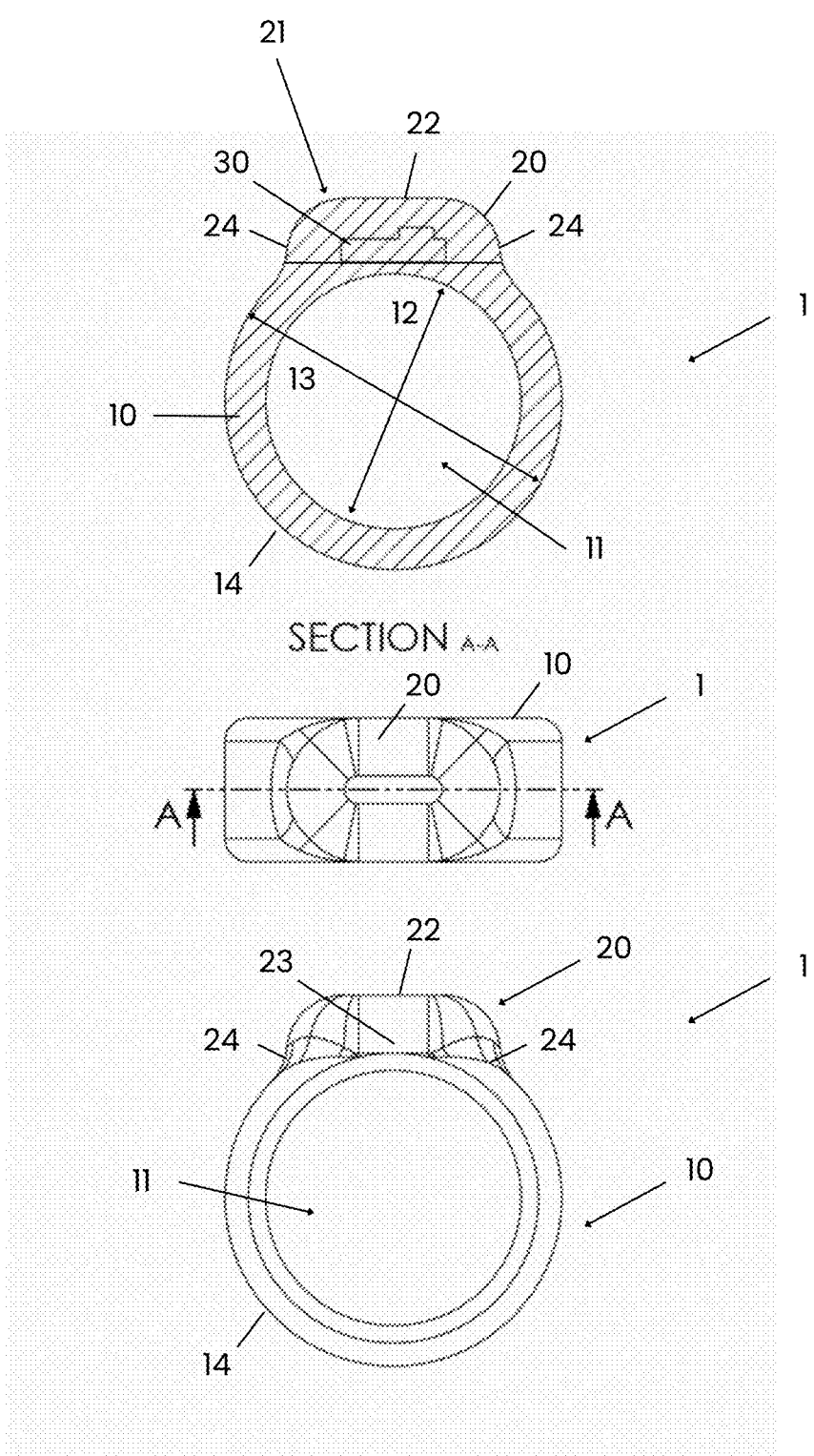
FIG. 3 illustrates a front elevation, plan elevation and section front elevation view of the first example grommet.

Referring to FIGS. 1-3, a first example of the grommet 1 described above is illustrated. FIG. 1 shows a rendered perspective view, FIG. 2 an exploded perspective view and FIG. 3 a front elevation, plan elevation and section front elevation view of the grommet 1.

As shown, the grommet 1 overall shape comprises an interior 2, exterior 3 and width 4. The grommet 1 further comprises a body 10. The body 10 has a ring shape although partial ring shapes may also be used. The body 10 has an opening 11, interior diameter 12, exterior diameter 13, exterior surface 14 and opening internal axis 15.

The grommet 1 further comprises a enclosure 20 with an exterior surface 21, a top 22, sides 23, ends 24 and, in these Figures, a longitudinal axis 25 orientated orthogonal to a longitudinal axis 15 of the body 10.

Enclosed within the body 10 and the enclosure 20 is an identifier tag 30 best seen in FIG. 2. The identifier tag 30 may comprise a first face 31, a second face 32, sides 33 and a longitudinal axis 34 as shown.

Figure 4:
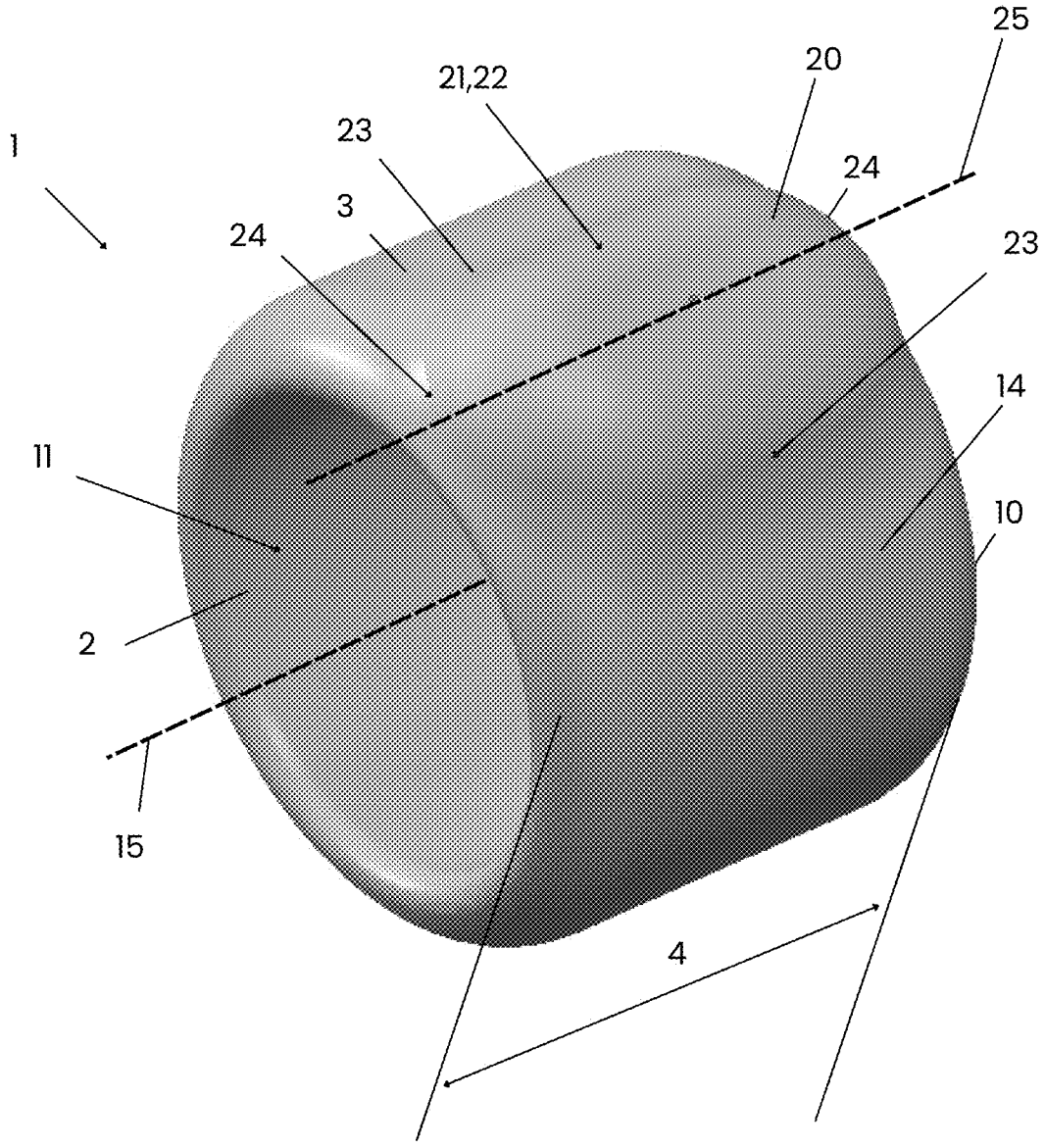
FIG. 4 illustrates a rendered perspective view of a second example of the grommet.
Figure 5:
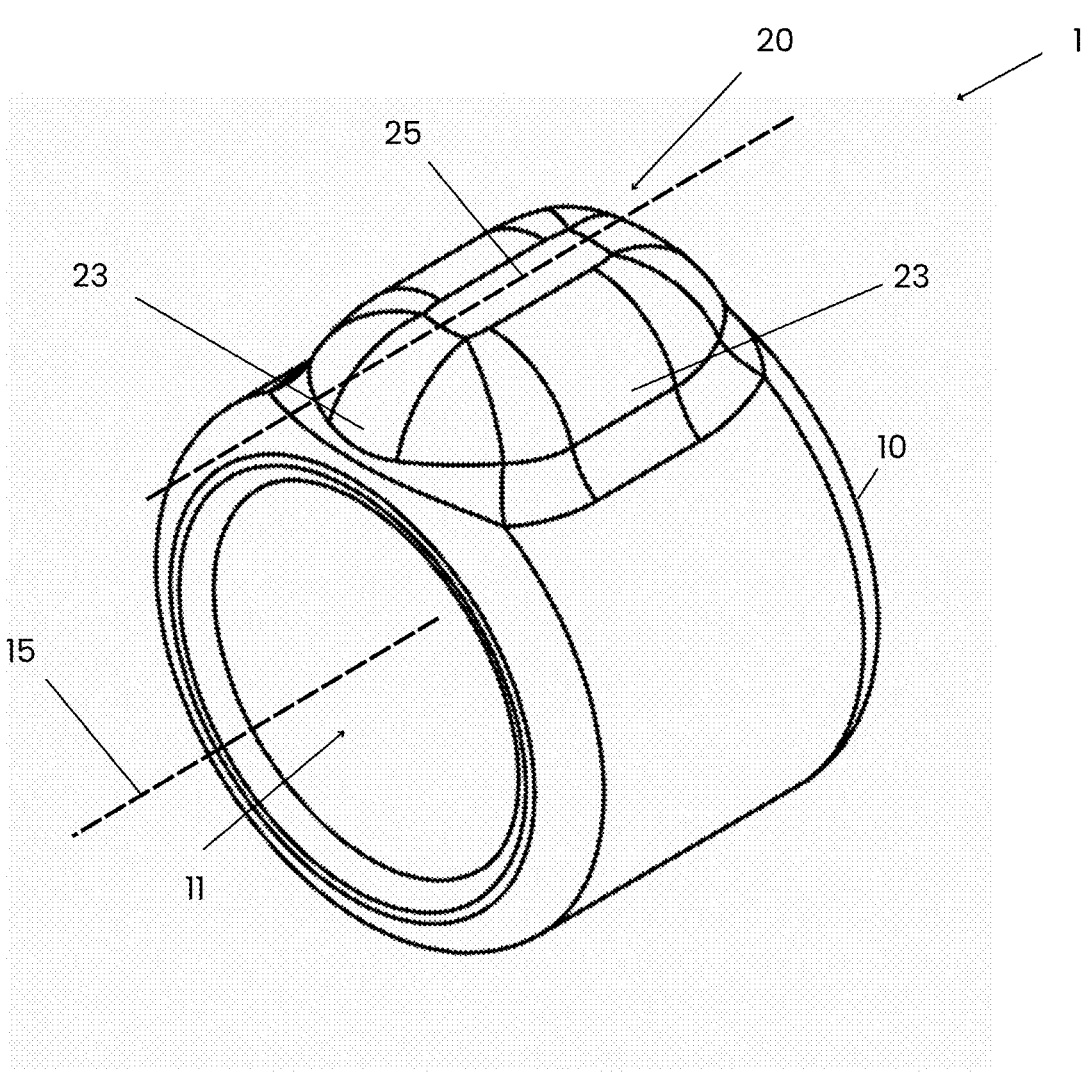
FIG. 5 illustrates an assembled perspective view of a second example of the grommet.
Figure 6:
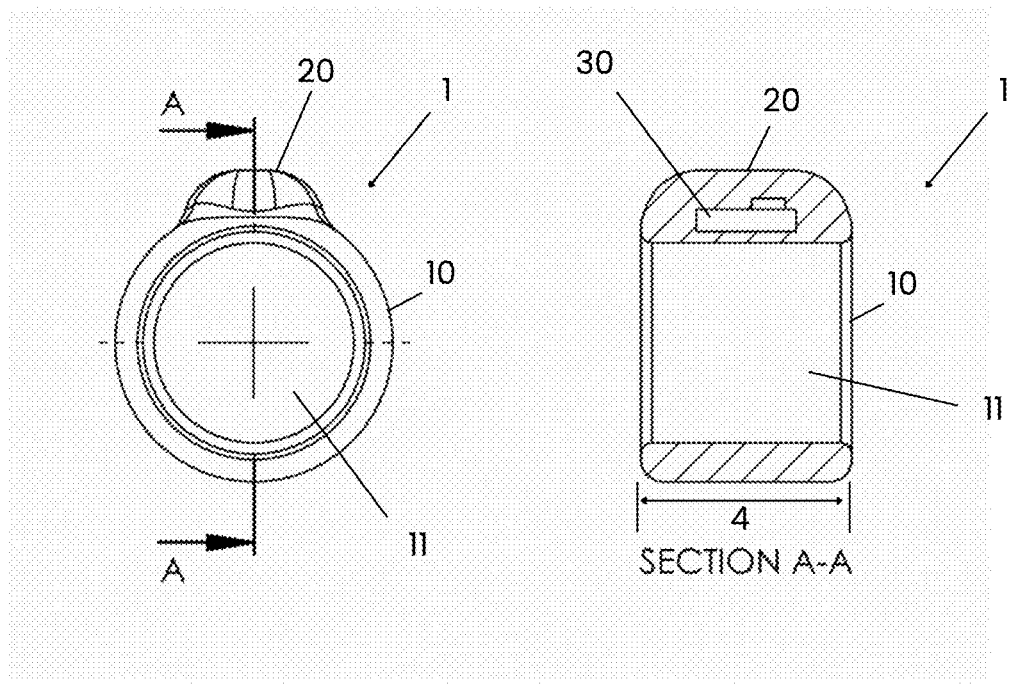
FIG. 6 illustrates a front elevation and a section front elevation view of the grommet.

FIGS. 4-6 illustrate a second example of the grommet 1. FIG. 4 shows a rendered perspective view, FIG. 5 an assembled perspective view and FIG. 6 a front elevation, section front elevation view of the grommet 1. In these Figures, the grommet 1 is the same as that shown in FIGS. 1-3 except that the enclosure 20 and identifier tag 30 are oriented so that the longitudinal axes 15, 25, 34 of the enclosure 20, the identifier tag 30 and the body 10 are all aligned. The width 4 of the grommet 1 in this example may be slightly larger than that shown in FIGS. 1-3 to ensure the identifier tag 30 is fully enclosed between the body 10 and enclosure 20.

The varied orientations noted above of the enclosure 20 and identifier tag 30 relative to the body 10 may be useful depending on the grommet position on the carabiner and orientation desired for the reader. The rectangular shape of the enclosure 20 and identifier tag 30 gives a visual indicia to the user on which way to hold a tag reader (not shown) relative to the identifier tag 30 to ensure first and rapid reading of the identifier tag 30 details.

The body 10 and the enclosure 20 may be manufactured from relatively hard materials capable of taking knocks and bumps and keeping the identifier tag sealed from the external environment. The material used for body 10 may have a slightly lower hardness than that used for the enclosure 20. This may be useful to allow easier fitting (sliding) of the grommet 1 onto a carabiner gate or frame. A slightly softer material may soften when heated to be more compliant and resilient during fitting and yet, once fitted maintain the grommet in position and have a high circular adherence to the carabiner. A higher hardness material for the enclosure 20 may be useful to protect the identifier tag 30 under the enclosure 20.

Figure 7:
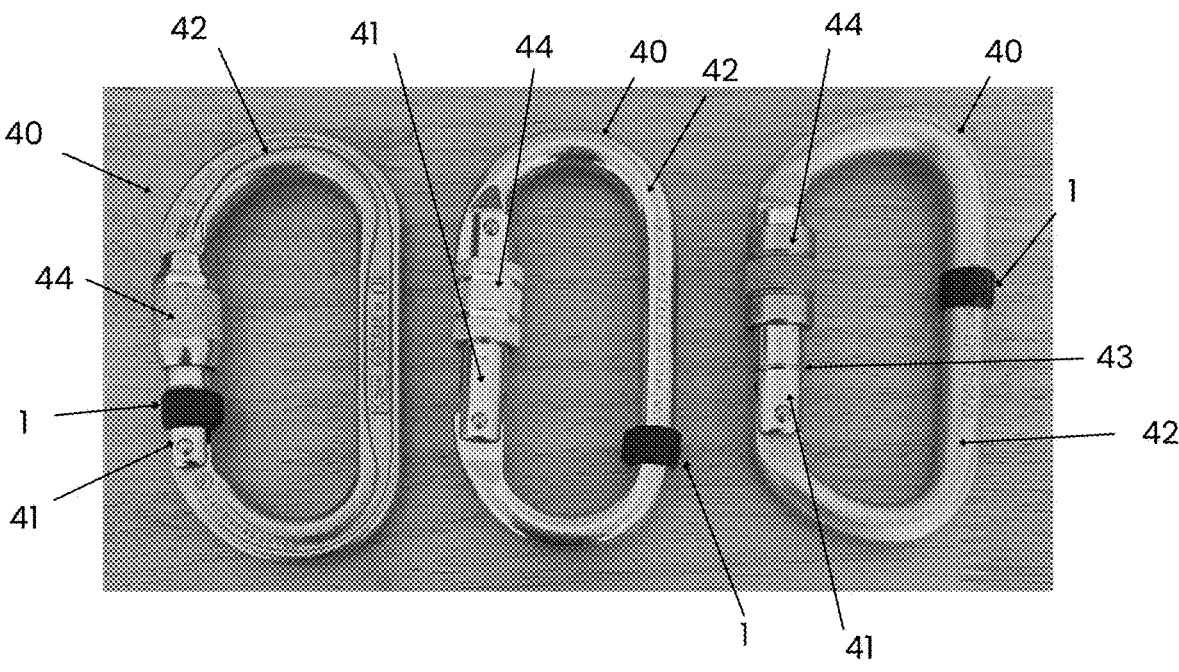
FIG. 7 illustrates a variety of carabiners with the grommet fitted to the carabiners.
Figure 7:
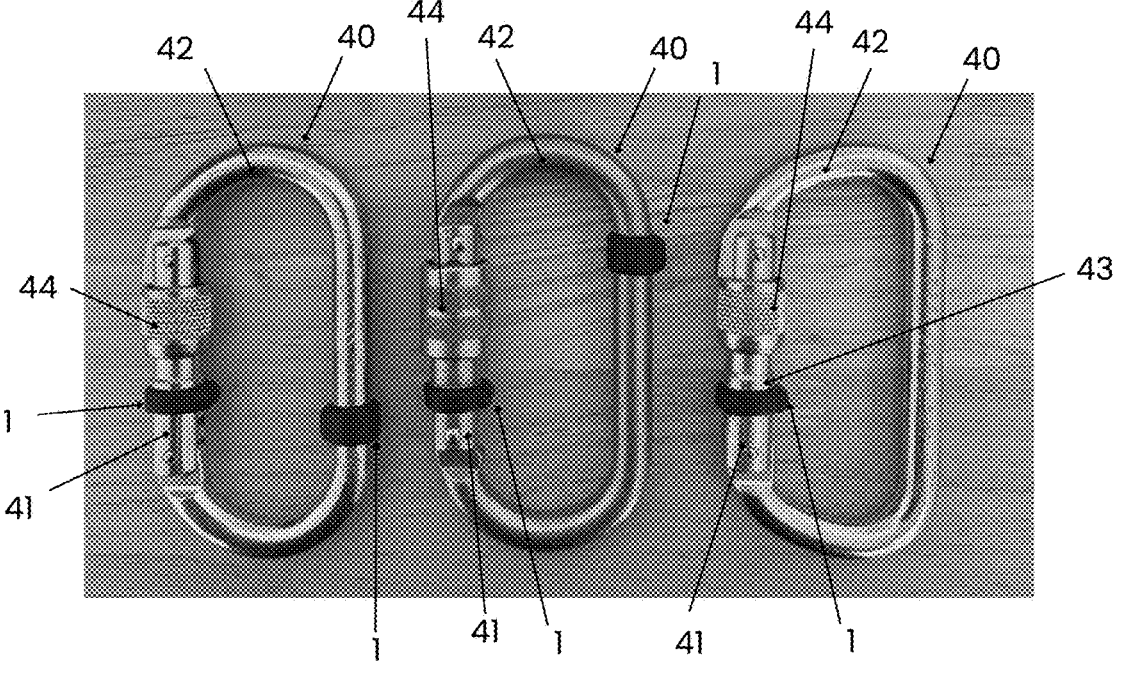

FIG. 7 shows a variety of carabiners 40 with the grommet 1 fitted to the carabiners 40. As shown, the grommet 1 may be fitted or slid on a gate 41 of the carabiner 40 or a frame 42 of the carabiner e.g. the frame spine 45. The grommet 1 has an internal diameter that is a snug fit or interference fit relative to the diameter of the gate 41 or frame 42. The carabiner 40 may also comprises a groove or recess 43. The grommet 1 may be sized to fit into this groove 43 at least to some extent.

The carabiner 40 may also comprises a barrel 44. The grommet 1 may be located at least slightly distant to the barrel 44 so as not to interfere with barrel 44 operation. Alternatively, the grommet 1 may be fitted to the barrel 44 (not shown).

The grommet 1 may be manufactured in two parts, the first part being the body 10 manufactured via a mould using a first material and the second part being the enclosure 20 manufactured from a second material via a mould. The two parts may be assembled about an identifier tag 30, the identifier tag 30 being over-moulded by the enclosure over the body. Injection moulding may be used to form the body 10 and the enclosure 20. The first material noted and the second material noted may be materials with varying hardness or may have the same hardness or may even be the same material.

A grommet 1 may be fitted to a carabiner 40 by urging the gate 41 or frame 42 of the carabiner 40 through the grommet 1 opening 11 (or vice versa). The grommet 1 may slide over the gate 41 or frame 42 to the desired position. Alternatively, if a barrel 44 is present, the grommet 1 may be slid into the barrel 44. The grommet 1 may be heated to hot water to a temperature of 30-100° C. prior to fitting (not shown).

Aspects of the grommet, a carabiner with a grommet, and methods of manufacture and assembly have been described by way of example only and it should be appreciated that modifications and additions may be made thereto without departing from the scope of the claims herein.

What is claimed is:

1. A carabiner comprising:
   a frame with a frame spine;
   a gate; and
   a barrel;
   the carabiner comprising thereon, at least one grommet
      the at least one grommet comprising:
      a body comprising a partial or complete ring shape with an opening therein and an interior diameter and an exterior diameter;
      an enclosure moulded onto a portion of the body; and
      an identifier tag with a first face, a second face, and sides, the identifier tag enclosed within the body on the first face, and the enclosure on the second face and the sides of the identifier tag.

2. The carabiner as claimed in claim 1, wherein the interior diameter of the body of the at least one grommet is configured to provide a snug or interference fit on the gate, the frame, or the barrel of the carabiner.

3. The carabiner as claimed in claim 1, wherein an exterior surface of the body and the enclosure of the at least one grommet comprises a generally smooth surface.

4. The carabiner as claimed in claim 1, wherein the enclosure of the at least one grommet is generally rectangular in shape.

5. The carabiner as claimed in claim 1, wherein the enclosure of the at least one grommet is aligned so that a longitudinal axis of the enclosure aligns with an internal axis of the opening in the at least one grommet.

6. The carabiner as claimed in claim 1, wherein a longitudinal axis of the enclosure of the at least one grommet is orthogonal to an internal axis of the opening in the at least one grommet.

7. The carabiner as claimed in claim 1, wherein a hardness of the body of the at least one grommet is equivalent to a 'hard' hardness using a Shore scale.

8. The carabiner as claimed in claim 1, wherein a hardness of the body of the at least one grommet is from a Shore D 30 hardness to a Shore D 60 hardness.

9. The carabiner as claimed in claim 1, wherein a hardness of the enclosure of the at least one grommet is equivalent to a 'hard' to 'extra hard' hardness using a Shore scale.

10. The carabiner as claimed in claim 1, wherein a hardness of the enclosure of the at least one grommet is from a Shore D 40 hardness to a Shore D 80 hardness.

11. The carabiner as claimed in claim 1, wherein a hardness of the enclosure of the at least one grommet is identical, or greater than, a hardness of the body of the at least one grommet.

12. The carabiner as claimed in claim 1, wherein the body and the enclosure of the at least one grommet have an identical hardness.

13. The carabiner as claimed in claim 1, wherein the identifier tag is an NFC tag and the identifier tag, when assembled, sits flat on the body of the at least one grommet.

14. The carabiner as claimed in claim 1, wherein the identifier tag is a UHF RFID tag and the identifier tag, when assembled, sits flat on the body of the at least one grommet.

15. The carabiner as claimed in claim 1, wherein the at least one grommet is located on the gate of the carabiner.

16. The carabiner as claimed in claim 1, wherein the at least one grommet is located on the frame spine of the carabiner.

17. The carabiner as claimed in claim 1, wherein the at least one grommet is located on the barrel of the carabiner.

* * * * *